United States Patent [19]

Davey

[11] Patent Number: 4,955,650
[45] Date of Patent: Sep. 11, 1990

[54] CANNING RACK HANDLE

[76] Inventor: Dan E. Davey, E10424 5th St., Spokane, Wash. 99206

[21] Appl. No.: 314,080

[22] Filed: Feb. 23, 1989

[51] Int. Cl.⁵ .............................................. A47J 45/10
[52] U.S. Cl. ...................................... 294/26; 294/12; 294/27.1
[58] Field of Search ...................... 294/2, 15, 26, 27.1, 294/170, 12

[56] References Cited

U.S. PATENT DOCUMENTS

| | | | |
|---|---|---|---|
| 113,011 | 3/1871 | Boesen | 294/26 X |
| 161,678 | 4/1875 | Gardner | 294/26 X |
| 705,815 | 7/1902 | Beeching | 294/26 |
| 1,004,312 | 9/1911 | Totty | 294/12 X |
| 1,176,781 | 3/1916 | Schoon | 294/26 |
| 1,334,510 | 3/1920 | Waterbury | 294/26 |
| 1,426,257 | 8/1922 | Breyski | 294/26 X |
| 4,482,181 | 11/1984 | Shepherd | 294/12 |
| 4,574,512 | 3/1986 | Hahn | 294/26 X |

Primary Examiner—Russell D. Stormer

[57] ABSTRACT

A pair of hand tools for allowing removal of all seven filled jars from a canning pot at one time. This device comprises an elongated handle intersecting at an angle, other than a right angle, two main shafts to form three grips for the users fingers. There is a hook located at the end of each of these shafts which is made to grasp a wire rack handle.

3 Claims, 1 Drawing Sheet

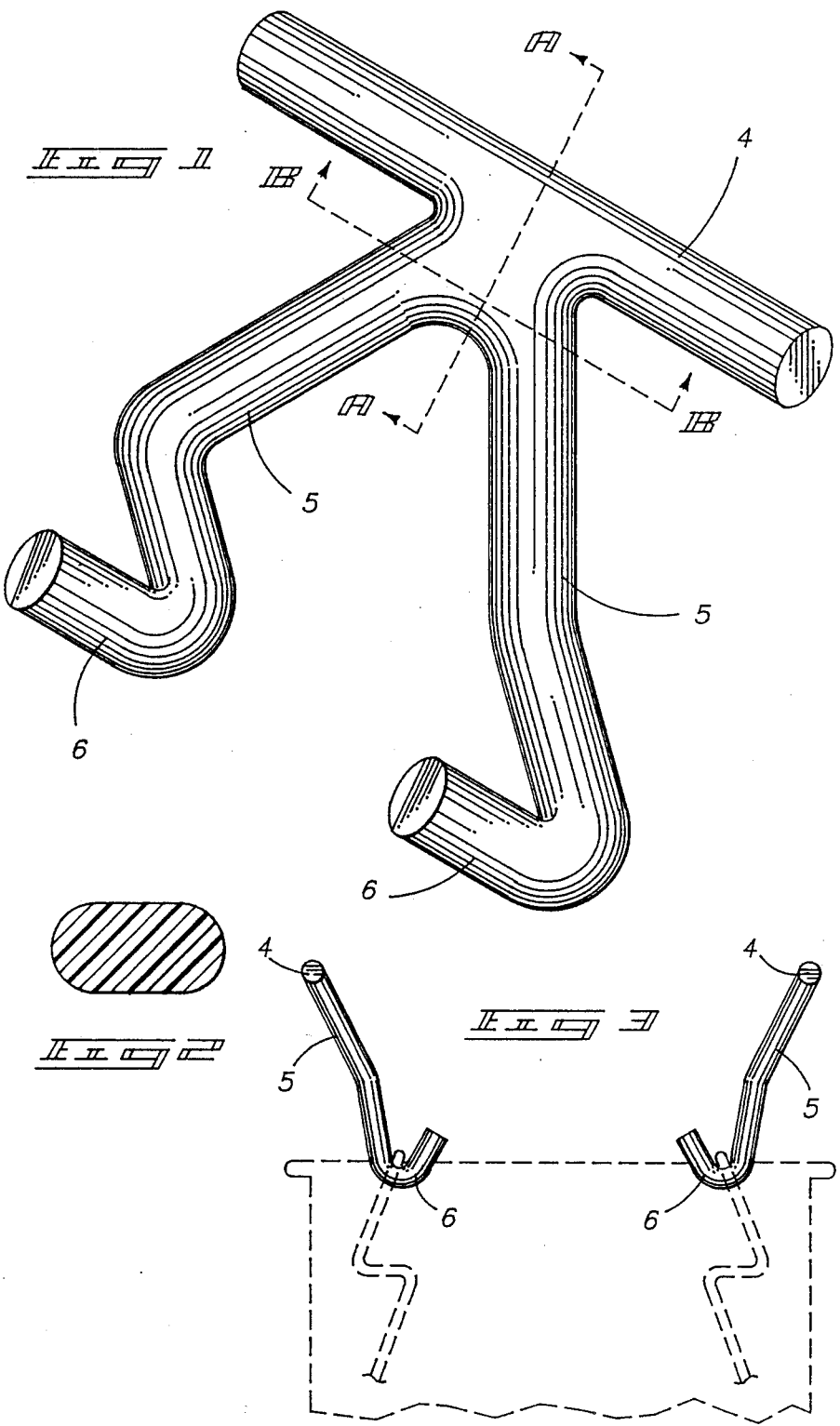

CANNING RACK HANDLE

BACKGROUND OF INVENTION a. Field of Invention

The invention is a pair of matching hand tools which are for lifting jars of home canned food from a pot of boiling water for cooling prior to storage.

b. Description of Prior Art

All models of tongs currently in use lift only one jar of food at a time. The design of these tongs forces their operator to position his hands directly over the boiling water thereby causing hot steam discomfort to the operator.

SUMMARY OF INVENTION

The invention relates to a device which allows several jars of home canned food to be lifted from a water bath canner at one time. The invention preferably comprises a single piece of molded plastic having two hooks at one end which are joined to handle by two main shafts. These hooks are at an angle to each of these two main shafts such that the operator is able to position his hands outside the water bath canner which is filled with boiling water.

DESCRIPTION OF THE DRAWINGS

FIG. 1 is a plan view showing an embodiment of the canning rack handle.

FIG. 2 is an elevation view of the embodiment of canning rack handles.

FIGS. 3 and 4 are a sectional view along section AA and BB respectively.

FIG. 5 is a plan view showing in greater detail the embodiment of the canning rack handles.

DESCRIPTION OF PREFERRED EMBODIMENT

This hand tool comprises two hooks 2 joined at a 45° angle to each of two main shafts 1. Each of the two main shafts 1 is joined to the handle 4 at a 70° angle. The intersection of the two main shafts 1 and the handle 4 forms a hand grip 3 for the operators first, middle, and ring fingers. The length of the two main shafts 1 enables the operator to position his hands outside the water bath canner which is filled with boiling water. With a canning rack handle in each hand, the operator reaches in from outside the canner (rather than from directly over it) and uses the two hooks 5 to grasp each handle of the wire rack. This wire rack, which holds seven jars of home canned food, is then lifted from the boiling water for cooling.

I claim:

1. A hand hook comprising:
    an elongate handle;
    a pair of shafts extending from a point between the ends of the handle at angles other than ninety degrees to form three grips for a user's fingers; and a hook defined at the distal end of each shaft.

2. The hand hook as recited in claim 1 in which the hooks are adapted to grasp a wire rack handle.

3. The hand hook as recited in claim 1 in which the hand hook is used in combination with another similar hook, one in each hand of the user, to lift a wire rack containing at least one jar from a container of boiling water.

* * * * *